United States Patent
Tsuchida

(10) Patent No.: US 9,124,451 B2
(45) Date of Patent: Sep. 1, 2015

(54) FREQUENCY CORRECTION CIRCUIT, RADIO RECEIVING APPARATUS, AND FREQUENCY CORRECTION METHOD

(75) Inventor: Junya Tsuchida, Kanagawa (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 238 days.

(21) Appl. No.: 13/460,683

(22) Filed: Apr. 30, 2012

(65) Prior Publication Data

US 2012/0281791 A1  Nov. 8, 2012

(30) Foreign Application Priority Data

May 2, 2011 (JP) .................................. 2011-102837

(51) Int. Cl.
*H04L 27/00* (2006.01)
*H04L 7/00* (2006.01)

(52) U.S. Cl.
CPC .......... *H04L 27/0014* (2013.01); *H04L 7/0029* (2013.01); *H04L 2027/003* (2013.01); *H04L 2027/0046* (2013.01)

(58) Field of Classification Search
CPC .............. H04L 2027/0067; H04L 2027/0069; H04L 1/0045; H04L 27/38; H04L 7/0029
See application file for complete search history.

(56) References Cited

U.S. PATENT DOCUMENTS

| | | | |
|---|---|---|---|
| 5,936,720 A * | 8/1999 | Neal et al. | 356/121 |
| 6,111,671 A * | 8/2000 | Bahuguna et al. | 359/30 |
| 6,507,603 B1 * | 1/2003 | Haga et al. | 375/147 |
| 2001/0016055 A1 * | 8/2001 | Harkless et al. | 382/115 |
| 2001/0033603 A1 * | 10/2001 | Olaker | 375/143 |
| 2002/0015437 A1 * | 2/2002 | Li et al. | 375/146 |
| 2002/0029116 A1 * | 3/2002 | Sills et al. | 702/39 |
| 2004/0141570 A1 * | 7/2004 | Yamazaki et al. | 375/340 |

(Continued)

FOREIGN PATENT DOCUMENTS

| | | |
|---|---|---|
| JP | 2006-074276 A | 3/2006 |
| JP | 2007-019985 A | 1/2007 |

(Continued)

OTHER PUBLICATIONS

ECMA-368, "High Rate Ultra Wideband PHY and MAC Standard", 3rd Edition, Dec. 2008.

*Primary Examiner* — Chieh M Fan
*Assistant Examiner* — Sarah Hassan
(74) *Attorney, Agent, or Firm* — McGinn IP Law Group, PLLC

(57) ABSTRACT

A radio receiving apparatus according to the present invention receives a preamble signal through one frequency band and also detects a periodic symbol timing in a receiving period of a part of a symbol that composes the preamble signal. A frequency correction circuit includes a generating unit, a detecting unit, and a correction unit. The generating unit generates a detection window of a predetermined time width including each of a first and a second symbol timing that are previously determined among the periodic symbol timings in the receiving period of a remaining symbol that composes the preamble signal. The detecting unit sequentially receives a correlation value between the preamble signal and a reference signal and detects a maximum value from the correlation value input during a period when the detection window is opened. The correction unit corrects a frequency deviation of the one frequency band based on the maximum value.

8 Claims, 11 Drawing Sheets

(56) References Cited

U.S. PATENT DOCUMENTS

2006/0067412 A1* 3/2006 Qiu et al. .................. 375/260
2008/0043886 A1* 2/2008 Inagawa et al. ............ 375/343

FOREIGN PATENT DOCUMENTS

| JP | 2008-048239 A | 2/2008 |
| JP | 2009-141634 A | 6/2009 |

* cited by examiner

FREQUENCY CORRECTION CIRCUIT, RADIO RECEIVING APPARATUS, AND FREQUENCY CORRECTION METHOD

CROSS-REFERENCE TO RELATED APPLICATIONS

This application is based upon and claims the benefit of priority from Japanese patent application No. 2011-102837, filed on May 2, 2011, the disclosure of which is incorporated herein in its entirety by reference.

BACKGROUND

The present invention relates to a frequency correction circuit, a radio receiving apparatus, and a frequency correction method, and particularly to a technique for referring to a correlation value of a preamble signal and correcting a frequency offset (frequency deviation) between transmission and reception.

In the field of wireless communication such as mobile phones and wireless LAN (Local Area Network), a receiving apparatus generally detects a periodic symbol timing by carrier sense at the time of starting the reception and also performs subsequent receiving operations according to the detected symbol timing. The receiving apparatus here detects the symbol timing using a preamble signal for synchronous acquisition transmitted in advance of a data signal.

As an example of the communication system that adopts such a preamble signal, Standard ECMA-368, "High Rate Ultra Wideband PHY and MAC Standard", 3rd Edition, December, 2008 discloses the MB-OFDM (Multiband-Orthogonal Frequency Division Multiplex) system. In order to realize low transmission power and broadband communication which are the characteristics of the UWB (Ultra Wide Band) communication, the MB-OFDM system adopts frequency hopping that performs transmission and reception while hopping among a plurality of frequency bands. The frequency hopping is one of the spread spectrum systems, and is a method for communication by specifying a rule called a hopping sequence between the transmitting side and the receiving side and switching a frequency of a carrier by predetermined time within a certain communication band according to the hopping sequence. In the MB-OFDM system, the preamble signal is also transmitted by the frequency hopping.

FIG. 9 shows a transmission example of the preamble signal in the MB-OFDM system.

The preamble signal is composed of 24 symbols S0 to S23 and transmitted through hopping three frequency bands f1 to f3. The receiving side synchronizes a receiving band with the frequency hopping in accordance with the hopping sequence, and thereby receiving and demodulating the symbols S0 to S23, which are dispersedly transmitted to the frequency bands f1 to f3. At the time of synchronizing, the hopping preamble signal must be surely detected. Therefore, the receiving side fixes the receiving band to a waiting band (the frequency band f1 in the example of FIG. 9), establishes symbol timing synchronization in the receiving period of a part of the symbols (the symbols S0 to S4 in the example of FIG. 9), and thereby detecting the preamble signal (hopping synchronization). After the preamble signal is detected, the frequency hopping is started, and in the receiving period of the remaining symbols (the symbols S5 to S23 in the example of FIG. 9), initial acquisition operations such as AGC (Automatic Gain Control), AFC (Automatic Frequency Control), and frame synchronization, are performed.

As described above, the symbol timing synchronization fixes the receiving band to one frequency band and is performed before AGC. Therefore, the detected symbol timing is not necessarily optimal for the received signal after AGC. In other words, the symbol timing synchronization is coarse timing synchronization. Therefore, after the symbol timing is adjusted in the operation period of AGC, it is usually necessary to perform processes such as AFC.

Japanese Unexamined Patent Application Publication No. 2007-19985 discloses such an adjusting method of the symbol timing. This adjusting method is to detect a difference between a peak position of a cross-correlation value and an expected value determined from a hopping timing while performing the frequency hopping and adjust the hopping timing to match the peak position of the cross-correlation value and the expected position. Since the hopping timing can be uniquely determined when the differences between the peak position and the expected position match in all the frequency bands, the symbol timing is used in common among the frequency bands. On the other hand, under the situation where the peak positions differ among the frequency bands, processes such as averaging and weighting are performed, and thereby compulsorily determining one symbol timing.

Note that as a related technique, Japanese Unexamined Patent Application Publication No. 2008-48239 discloses a technique to detect the symbol timing more accurately. Further, Japanese Unexamined Patent Application Publication No. 2006-74276 discloses the technique to reduce the power consumption at the time of detecting the symbol timing.

On the other hand, Japanese Unexamined Patent Application Publication No. 2009-141634 (Yasukawa) discloses a radio receiving apparatus that performs AFC. A configuration of the radio receiving apparatus 1x disclosed by Yasukawa is shown in FIG. 10.

The radio receiving apparatus 1x includes an RF (Radio Frequency) unit 10, an A/D (Analog to Digital) converting unit 20, a matched filter 30, an evaluating unit 40, a frequency correction circuit 50x, and a complex multiplier 60.

In the operation, the RF unit 10 receives a radio signal via an antenna in the state in which the receiving band is fixed to the waiting frequency band and converts the received signal into a complex baseband signal (I and Q signals). The A/D converting unit 20 includes an A/D converter to convert these complex baseband signals into digital signals. The matched filter 30 calculates a complex correlation value 401 from the digital signal output from the A/D converting unit 20 and the previously stored reference signal (known preamble signal pattern), and outputs the complex correlation value 401 to the evaluating unit 40.

The evaluating unit 40 detects a peak of the correlation value 401 and detects a detection timing thereof as a symbol timing 402. Then, the evaluating unit 40 repeatedly outputs the symbol timing 402 at a symbol period. In the MB-OFDM system, the symbol period is "165T" period as shown in FIG. 9. The period of "1/165 MHz" is indicated by 1T.

Further, when the symbol timing 402 is detected, the RF unit 10 starts the frequency hopping to the receiving band.

Furthermore, the frequency correction circuit 50x generates a frequency correction signal 403 according to the complex correlation value 401.

Specifically, the frequency correction circuit 50x is configured as shown in FIG. 11. The frequency correction circuit 50x includes "d" frequency offset detection circuits 310_1 to 310_d that are provided to correspond to the periods (d sample periods) in which a delayed wave could exist in the radio transmission line, an arctangent operator 320, an NCO (Numerically Controlled Oscillator) 350, an averaging unit 360, and "d-1" delay circuits 370_1 to 370_d-1.

Additionally, each of the frequency offset detection circuits 310_1 to 310_d includes an n-symbol delay circuit 311, a complex conjugate operator 312, and a complex multiplier 313.

In the operation, the complex correlation value 401 from the matched filter 30 is input to the frequency offset detection circuit 310_1 as it is. On the other hand, the correlation value 401 is delayed by one sample period and input by the delay circuits 370_1 to 370_d-1 to the frequency offset detection circuits 310_2 to 310_d.

The n-symbol delay circuit 311 inside each frequency offset detection circuit 310_1 to 310_d delays the input complex correlation value 401 by the time equivalent to n symbols (n="3" in the example of FIG. 9). The complex conjugate operator 312 performs a complex conjugate operation to the correlation value delayed by the n-symbol delay circuit 311.

The complex multiplier 313 performs complex multiplication to the complex correlation value input from the matched filter 30 and the complex conjugate operation result output from the complex conjugate operator 312. In other words, the complex multiplier 313 multiplies the correlation value corresponding to a current receiving symbol and a complex conjugate of the correlation value of n symbol before the current receiving symbol (the correlation value corresponding to the previous receiving symbol in the same receiving band).

Then, the averaging unit 360 calculates an average of the complex multiplication result respectively output from the frequency offset detection circuits 310_1 to 310_d. Further, the arctangent operator 320 performs an arctangent operation to the average result output from the averaging unit 360, and thereby obtaining a frequency offset. Moreover, the NCO 350 generates the frequency correction signal 403 for canceling the frequency offset output from the arctangent operator 320, and the above complex multiplier performs the complex multiplication Accordingly, even when the symbol timing and the peak position of the correlation value shift as a result of AGC, the frequency offset between transmission and reception can be corrected.

In the MB-OFDM system in recent years, along with the expansion of the available carrier frequency bands, communication in high frequency bands in 6 GHz to 10 GHz is required in addition to the conventional 3 GHz to 4 GHz frequency bands. When the carrier frequency is increased, there is a problem that the propagation loss of the radio wave increases and the communication distance is reduced. Therefore, an improvement in the minimum receiving sensitivity in the radio receiving apparatus is desired.

On the other hand, with the cost-cutting demand in the market by the widespread use of mobile communication devices, cost reduction for LSI (Large Scale Integration) mounted on the radio receiving apparatus is also desired.

SUMMARY

However, the present inventor has found a problem in the technique disclosed by Yasukawa that while the frequency offset can be corrected when the symbol timing and the peak position of the correlation value differ, the size of the frequency correction circuit (in other words, the development cost) increases. The reason is because it is necessary to mount the abovementioned frequency offset detection circuit for the number corresponding to the period when the delayed wave could exist. Note that this problem is generated regardless of whether or not the frequency hopping is adopted.

An embodiment of the present invention is a radio receiving apparatus that receives a preamble signal through one frequency band and also detects a periodic symbol timing in a receiving period of a part of a symbol that composes the preamble signal. A frequency correction circuit includes a generating unit, a detecting unit, and a correction unit. The generating unit generates a detection window of a predetermined time width including each of a first and a second symbol timing that are previously determined among the periodic symbol timings in the receiving period of a remaining symbol that composes the preamble signal. The detecting unit sequentially receives a correlation value between the preamble signal and a reference signal and detects a maximum value from the correlation value input during a period when the detection window is opened. The correction unit corrects a frequency deviation of the one frequency band based on the maximum value.

Accordingly, in the present invention, a simple configuration using a detection window surely detects the correlation peak value that can appear in the certain period before and after the symbol timing and contributes to the correction of the frequency offset. Therefore, the frequency offset can be corrected even when the symbol timing and the peak position of the correlation value differ.

The present invention can improve the correction accuracy of the frequency offset while suppressing the increase in the circuit size.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
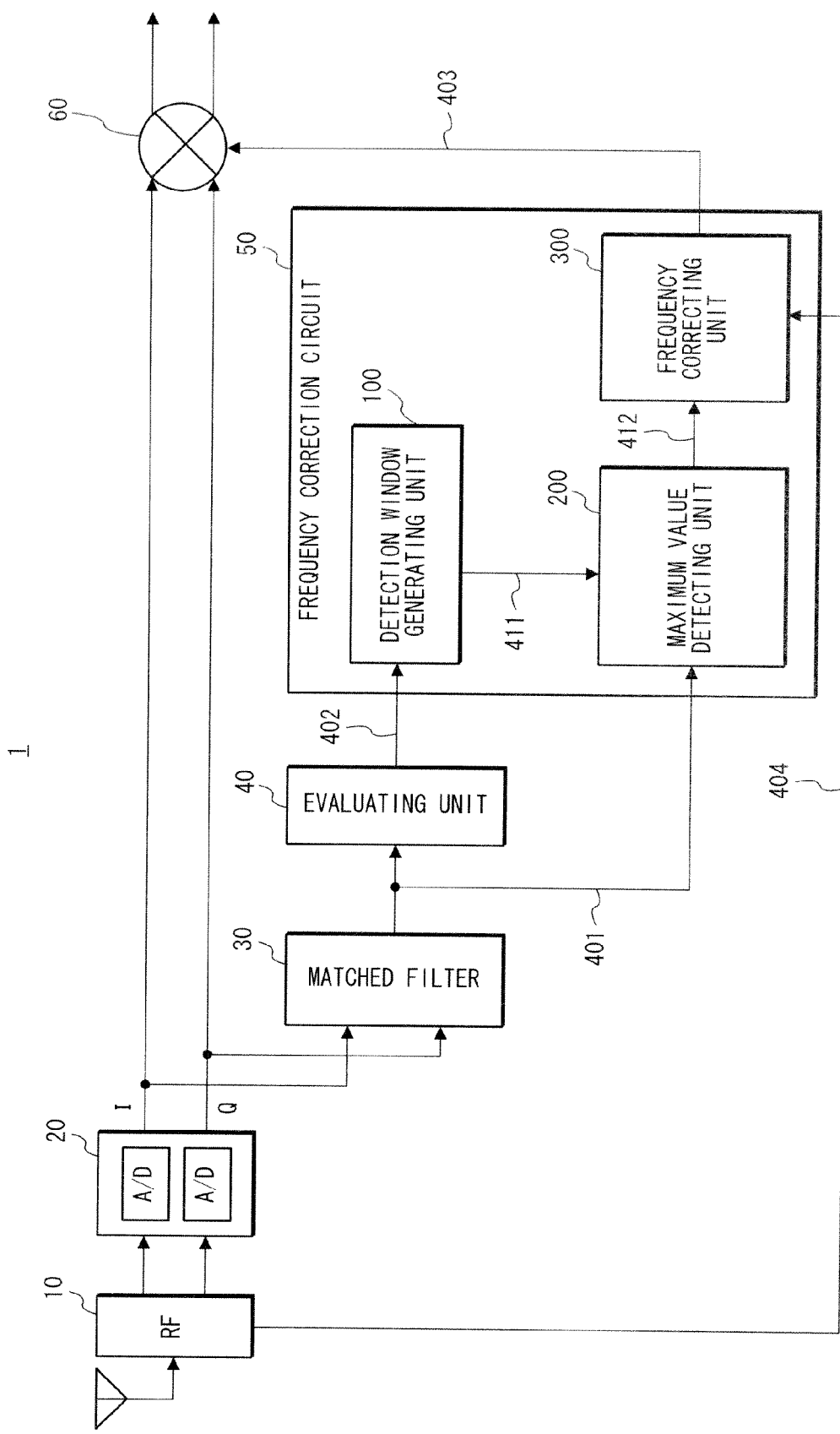
FIG. 1 is a block diagram showing a configuration example of a frequency correction circuit and a radio receiving apparatus according to an embodiment of the present invention.

Hereinafter, an embodiment of the present invention of a frequency correction circuit, and a radio receiving apparatus and a communication apparatus to which the frequency correction circuit is applied, is explained with reference to FIGS. 1 to 8. Note that the same components are denoted by the same reference numeral in each drawing, and the duplicate explanation is omitted as necessary for the clarity of the explanation.

Note that in this embodiment, the case in which the MB-OFDM system (in other words, the frequency hopping) is adopted as a communication system is explained as an example. However, the present invention can also be applied to other communication systems that do not perform the frequency hopping.

Figure 10:
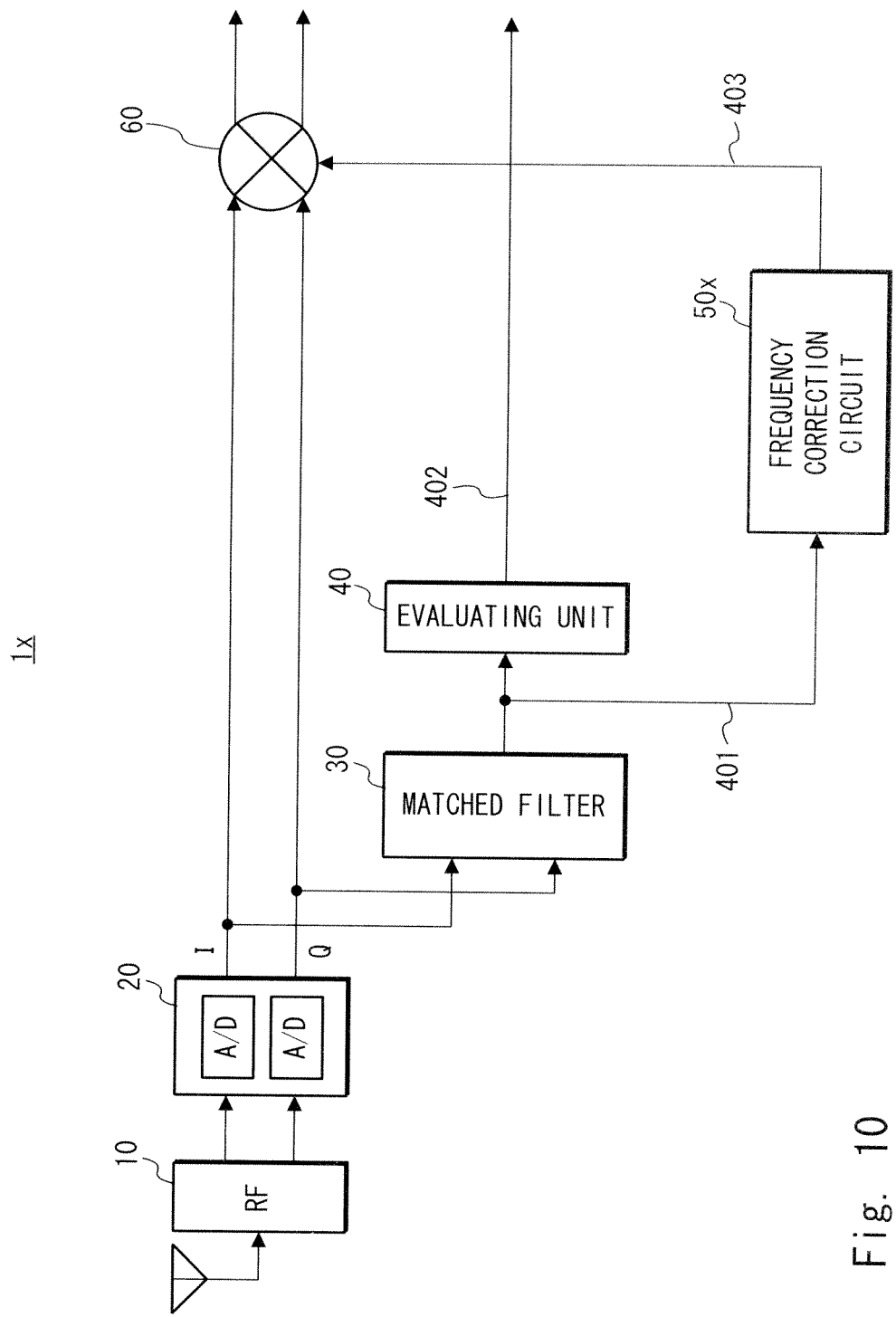
FIG. 10 is a block diagram showing a configuration example of a general radio receiving apparatus.

As shown in FIG. 1, a radio receiving apparatus 1 according to this embodiment composes a part of a communication apparatus, and includes an RF unit 10, an A/D converter 20, a matched filter 30, an evaluating unit 40, and a complex multiplier 60, which are similar to those in FIG. 10. Further, the radio receiving apparatus 1 includes a frequency correction circuit 50 according to this embodiment in place of the frequency correction circuit 50x shown in FIGS. 10 and 11. Although not illustrated, the radio receiving apparatus 1 includes a circuit and the like for performing AGC.

The frequency correction circuit 50 includes a detection window generating unit 100, a maximum value detecting unit 200, and a frequency correction unit 300.

Among these units, a first input of the symbol timing 402 from the evaluating unit 40 triggers the detection window generating unit 100 to operate and generate the detection window 411. The detection window 411 here is opened for predetermined time in the period including each of the two symbol timings determined for the frequency band.

Figure 2:
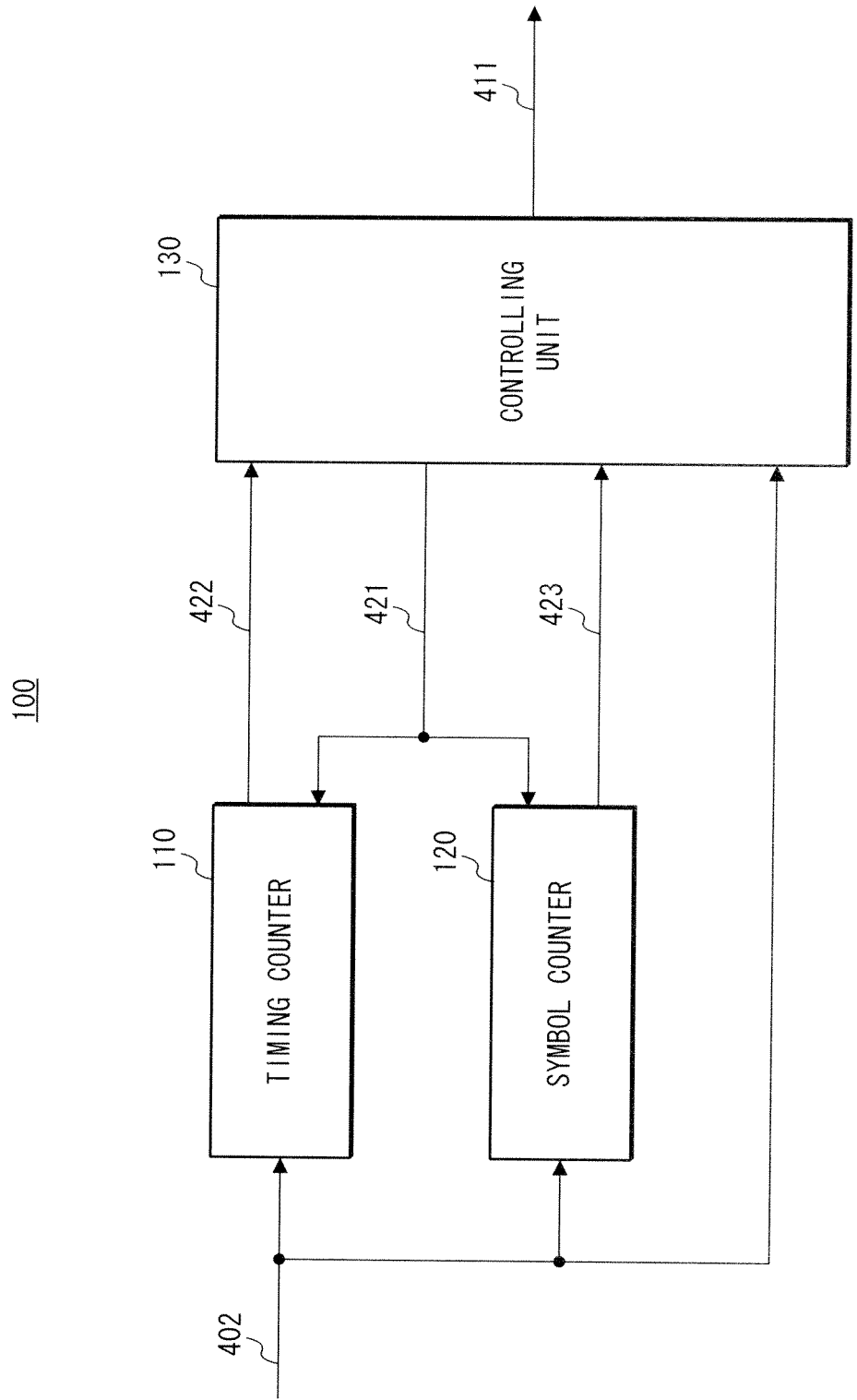
FIG. 2 is a block diagram showing a configuration example of a detection window generating unit used in the frequency correction circuit according to the embodiment of the present invention.

Specifically, as shown in FIG. 2, the detection window generating unit 100 includes a timing counter 110, a symbol counter 120, and a controlling unit 130. The symbol timing 402 is input in common to these timing counter 110, the symbol counter 120, and the controlling unit 130.

The timing counter 110 operates according to an enable signal 421 from the controlling unit 130 and outputs a timing count value 422 to the controlling unit 130. The timing count value 422 here is used to count the abovementioned symbol period "165T" by 1T and repeatedly presents values of 0T to 164T.

The symbol counter 120 operates according to the enable signal 421 from the controlling unit 130 and outputs the symbol count value 423 to the controlling unit 130. The symbol count value 425 here is incremented every time the symbol timing 402 is input.

A first input of the symbol timing 402 triggers the controlling unit 130 to generate the enable signal 421, so as to operate the timing counter 110 and the symbol counter 120. Moreover, the controlling unit 130 monitors the timing count value 422 and the symbol count value 423, and executes the generation process of the detection window 411 as described later.

Turning back to FIG. 1, the complex correlation values 401 from the matched filter 30 are sequentially input to the maximum value detecting unit 200. The maximum value detecting unit 200 detects a maximum value 412 (hereinafter may be referred to as a maximum correlation value) from the correlation values input during the period when the detection window 411 is opened.

Further, the frequency correction unit 300 recognizes the receiving band in the RF unit 10 according to a receiving band indication signal 404 output from the RF unit 10. Furthermore, the frequency correction unit 300 generates the frequency correction signal 403 according to the maximum correlation value 412, and the complex multiplier 60 performs complex multiplication of the received signal and the frequency correction signal 403.

Figure 3:
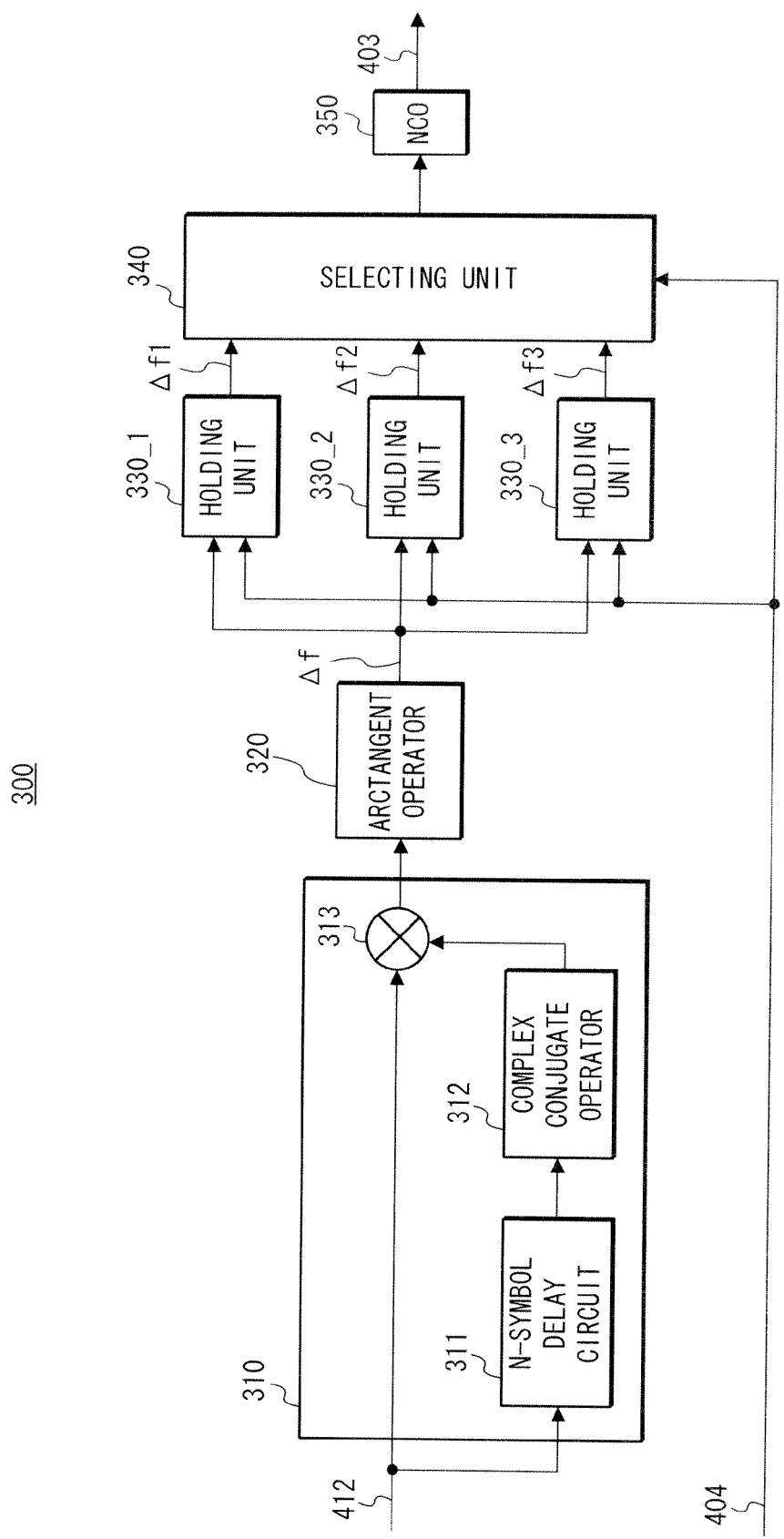
FIG. 3 is a block diagram showing a configuration example of a frequency correction unit used in the frequency correction circuit according to the embodiment of the present invention.

Specifically, as shown in FIG. 3, the frequency correction unit 300 includes one frequency offset detection circuit 310, an arctangent operator 320, three holding units 330_1 to 330_3, a selecting unit 340, and an NCO 350.

Figure 11:
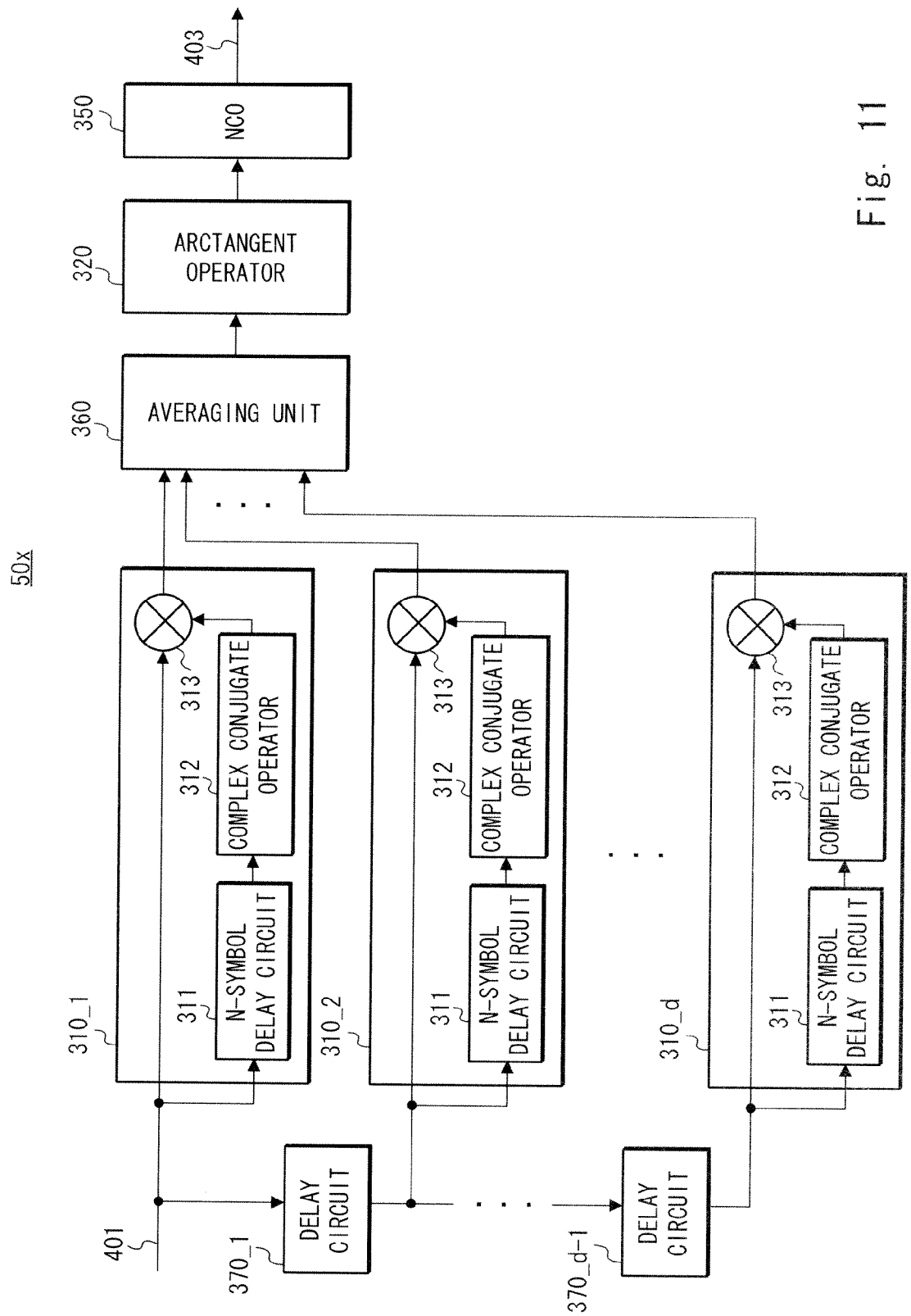
FIG. 11 is a block diagram showing a configuration example of a general frequency correction circuit.

The frequency offset detection circuit 310 includes a set of an n-symbol delay circuit 311, a complex conjugate operator 312, and a complex multiplier 313, which are similar to the those in FIG. 11. Accordingly, the maximum correlation value corresponding to the current receiving symbol output from the maximum value detecting unit 200 and the complex conjugate of the maximum correlation value corresponding to the previous receiving symbol in the same receiving band are input to the complex multiplier 313.

The arctangent operator 320 performs the arctangent operation and the like to the complex multiplication result output from the complex multiplier 313, and thereby obtaining a frequency offset $\Delta f$. More specifically, the arctangent operator 320 calculates the frequency offset $\Delta f$ by the following formula (1).

$$\Delta f = \arg(A/B)/(C*165)[\text{rad}/T] \qquad \text{formula (1)}$$

Figure 9:
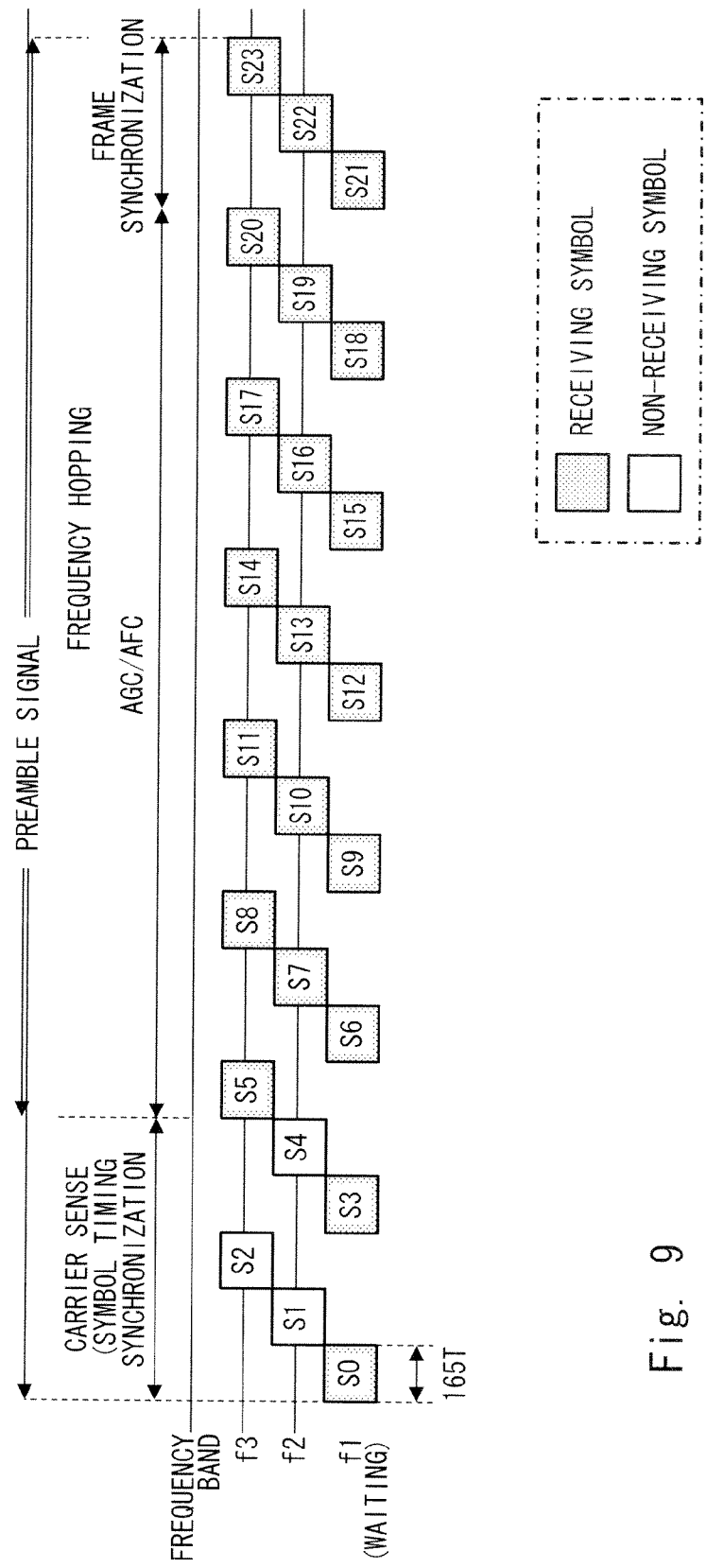
FIG. 9 is a time chart showing a transmission example of a preamble signal in the MB-OFDM system.

In the above formula (1), A is the maximum correlation value corresponding to the current receiving symbol, and B is the maximum correlation value corresponding to the previous receiving symbol in the same receiving band. Further, C differs depending on the value of TFC (Time Frequency Code, a code for specifying the hopping order). In the case of TFC1 (the receiving bands are switched in the order of f1→f2→f3→f1→ . . . as shown in FIG. 9) or TFC2 (the receiving bands are switched in the order of f1→f3→f2→f1→ . . . ), C is set to "3", and in other cases, C is set to "1". Further $\arg(z)$ $\arctan(\text{Im}(z)/\text{Re}(z))$. $\text{Im}(z)$ is a function to retrieve an imaginary part of an arbitrary complex number z, and $\text{Re}(z)$ is a function to retrieve a real part of the complex number z.

Each holding unit 330_1 to 330_3 performs an operation to hold the frequency offset $\Delta f$ according to the receiving band indication signal 404. More specifically, when the receiving band indication signal 404 indicates the frequency band f1, the holding unit 330_1 holds the frequency offset if as a frequency offset $\Delta f1$ for the frequency band f1. Similarly, the holding unit 330_2 holds the frequency offset $\Delta f2$ for the frequency band f2, and the holding unit 330_3 holds the frequency offset $\Delta f3$ for the frequency band f3.

The selecting unit 340 selects any one of the frequency offsets $\Delta f1$ to $\Delta f3$ output from the holding units 330_1 to 330_3 according to the receiving band indication signal 404, and outputs the selected frequency offset to the NCO 350. More specifically, when the receiving band indication signal 404 indicates the frequency band f1, the selecting unit 340 selects the frequency offset $\Delta 1$. Similarly, the selecting unit 340 selects the frequency offset $\Delta f2$ when the receiving band indication signal 404 indicates the frequency band f2, and selects the frequency offset $\Delta f3$ when the receiving band indication signal 404 indicates the frequency band f3.

Then, the frequency correction signal 403 according to the switched receiving band is generated in the NCO 350. Note that when the communication system that does not perform the frequency hopping is adopted, it is not necessary to install the holding units 330_1 to 330_3 and the selecting unit 340. In this case, the NCO 350 generates a unique frequency correction signal 403 using the frequency offset Δf output from the arctangent operator 320.

Next, the operation of this embodiment is explained in detail with reference to FIGS. 4 to 8. Note that in the following explanation, an example is explained with a case of TFC3 (the receiving bands are switched in the order of f1→f1→f2→f2→f3→f3→f1→f1→ . . . ).

Figure 4:
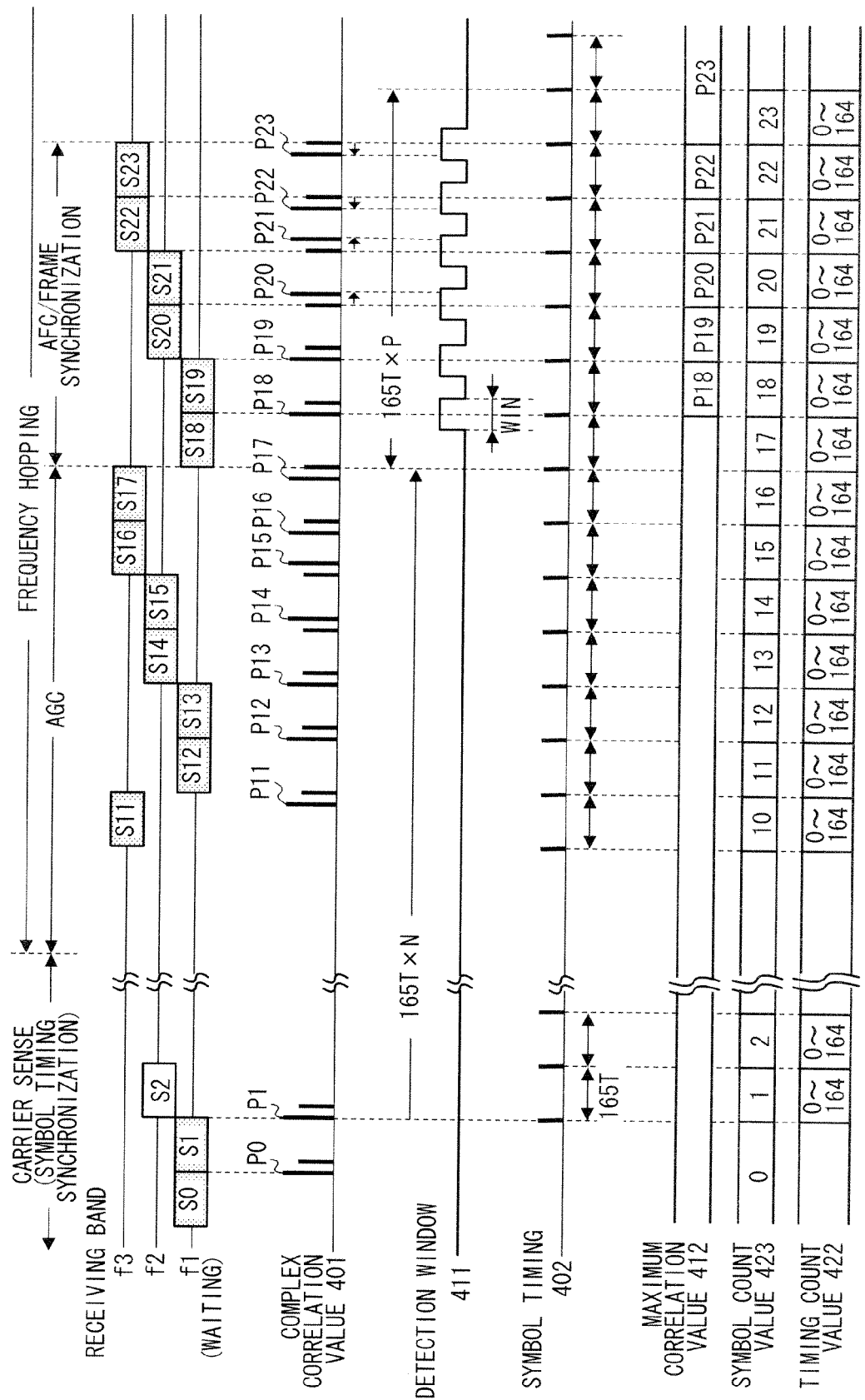
FIG. 4 is a time chart showing an overall operation example of the frequency correction circuit and the radio receiving apparatus according to the embodiment of the present invention.

In FIG. 4, a parameter N indicates a symbol count value to start detecting the frequency offset Δf. A parameter P indicates the number of symbols for detecting the frequency offset Δf. WIN indicates the time width of the detection window 411. The value of N differs depending on TFC. In the case of TFC1 or TFC2, N is "14". In the case of TFC3 or TFC4 (the receiving bands are switched in the order of f1→f1→f3→f→f2→f2→f1→f1→ . . . ), N is "17". In the case of TFC5 to TFC7 (the receiving bands are respectively fixed to f1 to f3), N is "20". The value of P differs depending on TFC, and in the case of TFC1 to TFC4, the value of P is "6" and in the case of TFC5 to TFC7, the value of P is "2". Note that the operation in the case of adopting the communication system that does not perform the frequency hopping is same as the case of TFC5 to TFC7.

As shown in FIG. 4, in a carrier sensing period, the RF unit 10 fixes the receiving band to the waiting frequency band (f1 in the example of FIG. 4). Therefore, the complex correlation value 401 output from the matched filter 30 presents a correlation peak P0 at the boundary of the receiving symbol S0, and presents a correlation peak P1 at the boundary of the receiving symbol Si. In response to these correlation peaks P0 and P1, the evaluating unit 40 detects the symbol timing 402 and repeatedly outputs the symbol timing 402 at the symbol period "165T". Further, the RF unit 10 starts the frequency hopping to the receiving band.

Figure 5:
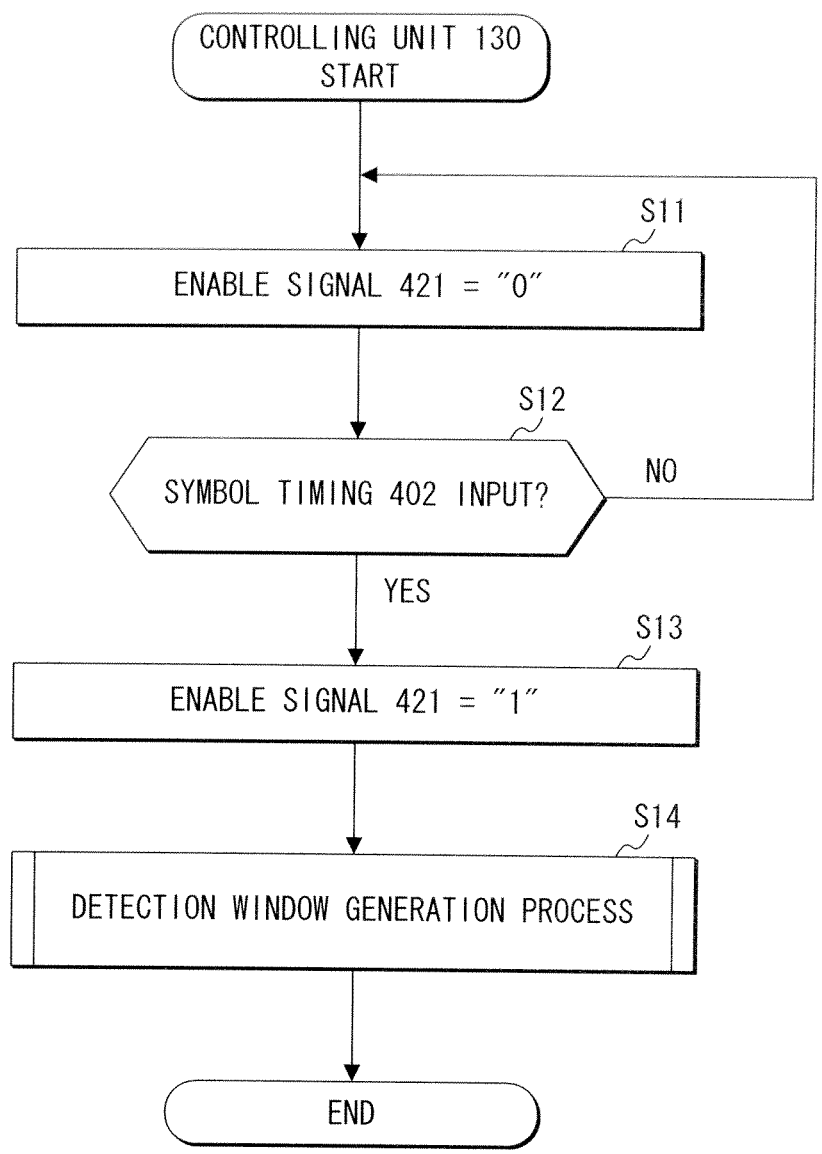
FIG. 5 is a flowchart showing an overall operation example of a controlling unit used in the frequency correction circuit according to the embodiment of the present invention.

At this time, the controlling unit 130 in the detection window generating unit 100 operates as shown in FIG. 5. Specifically, the controlling unit 130 maintains the enable signal 421 to "0" until the symbol timing 402 is input from the evaluating unit 40 (steps S11 and S12).

When the symbol timing 402 is input, the controlling unit 130 outputs the enable signal 421="1" to operate the timing counter 110 and the symbol counter 120 (step 13).

Then, the controlling unit 130 starts monitoring the timing count value 422 and the symbol count value 423, and moves to the generation process of the detection window 411 (step S14).

Figure 6:
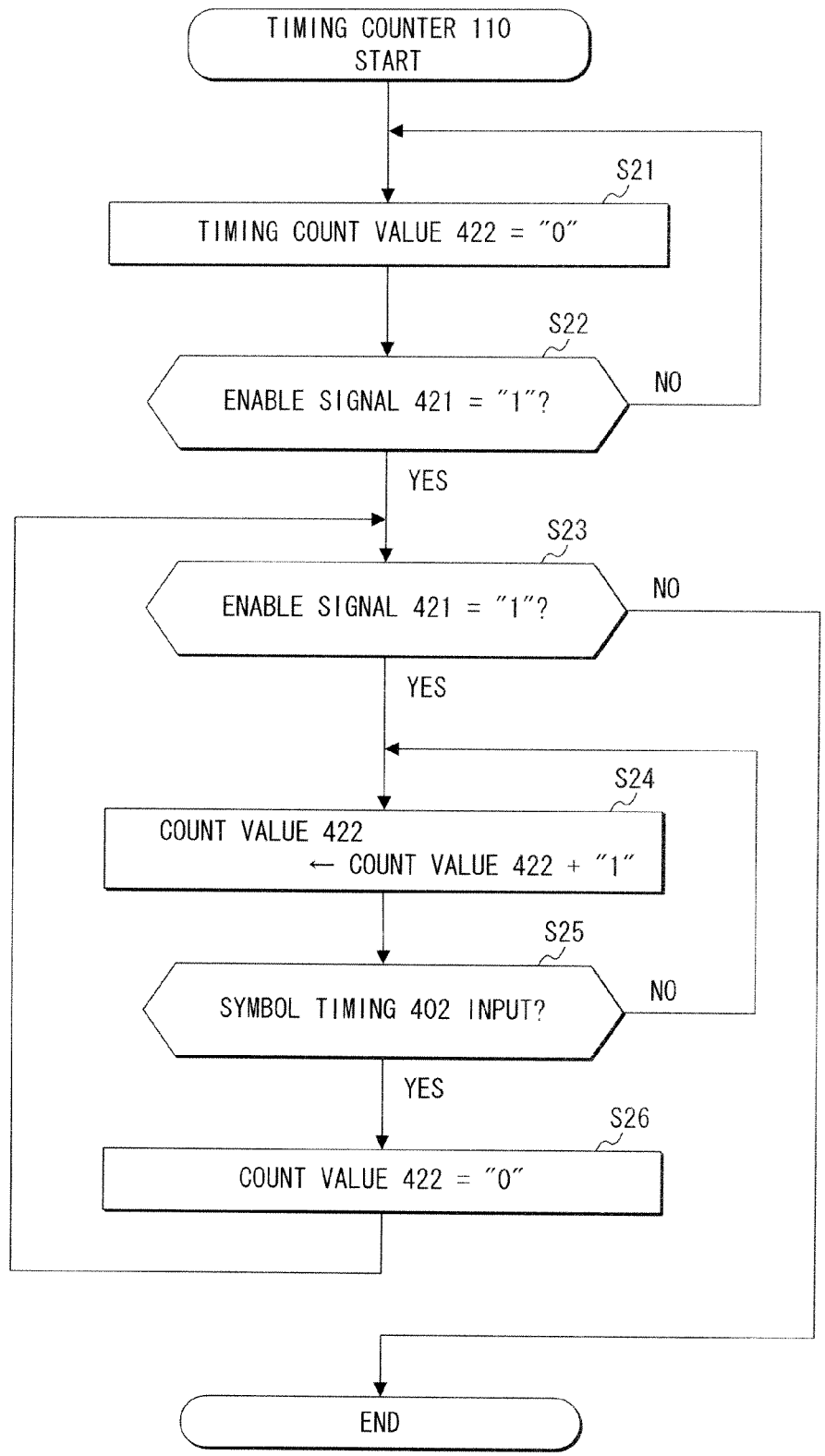
FIG. 6 is a flowchart showing an operation example of a timing counter used in the frequency correction circuit according to the embodiment of the present invention.

On the other hand, the timing counter 110 operates as shown in FIG. 6. Specifically, the timing counter 110 maintains the timing count value 422 to "0" until the enable signal 421="1" is input (steps S21 and S22).

When the enable signal 421="1" is input, the timing counter 110 repeatedly executes the processes shown in the steps S24 to S25 while the enable signal 421="1" is satisfied (step S23).

More specifically, the timing counter 110 increments the timing count value 422 by one every time "1T" elapses until the symbol timing 402 is input from the evaluating unit 40 (steps S24 and S25).

When the symbol timing 402 is input, the timing counter 110 resets the timing count value 422 to " " (step S26).

Then, the timing count value 422 repeatedly presents the values of 0T to 164T as shown in FIG. 4.

Figure 7:
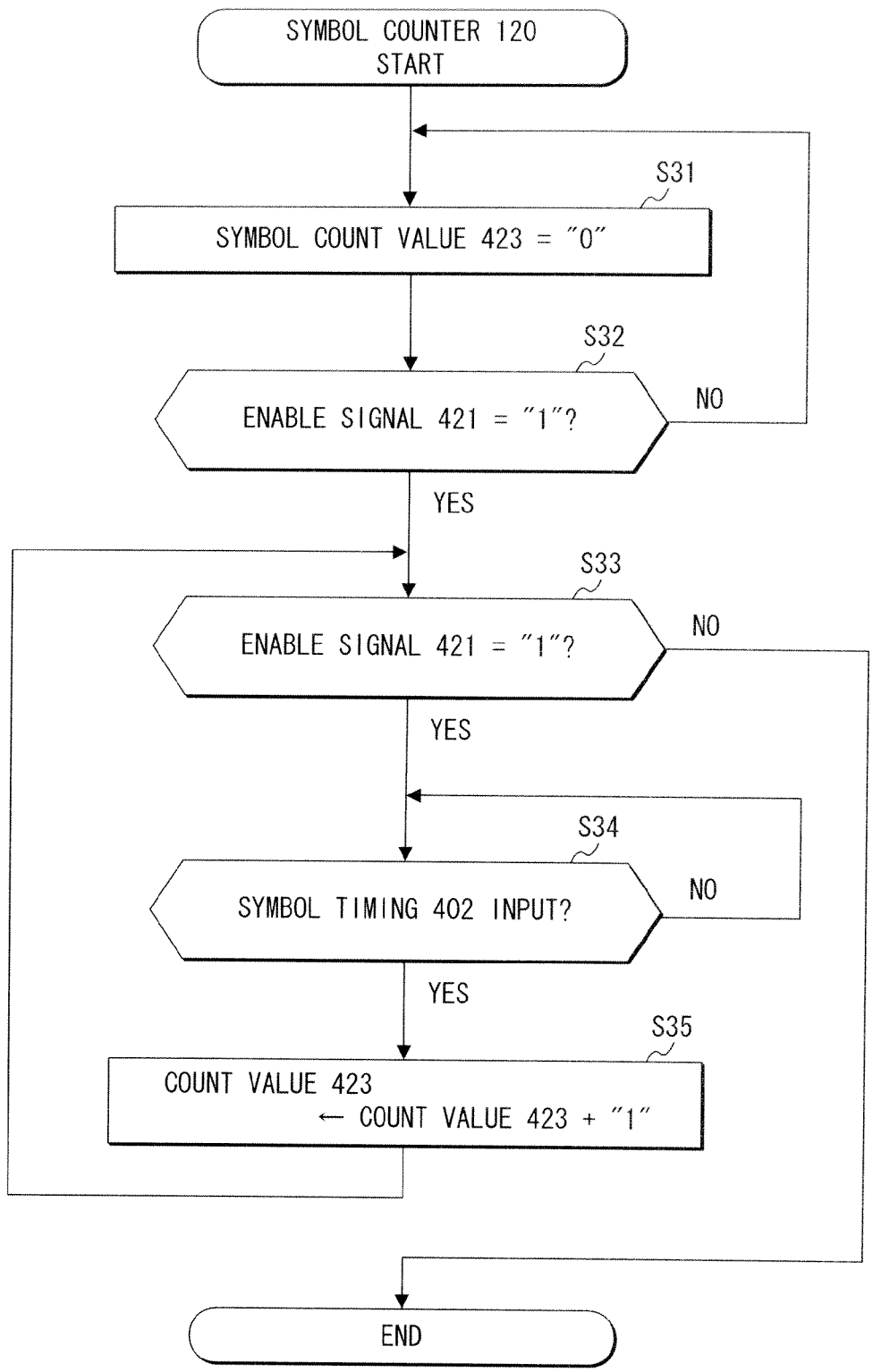
FIG. 7 is a flowchart showing an operation example of a symbol counter used in the frequency correction circuit according to the embodiment of the present invention.

Moreover, the symbol counter 120 operates as shown in FIG. 7. Specifically, the symbol counter 120 maintains the symbol count value 423 to "0" until the enable signal 421 "1" is input (steps S31 and S32.

When the enable signal 421="1" is input, the symbol counter 320 repeatedly executes the processes shown in the steps S34 and S35 while t e enable signal 421="1" is satisfied (step S33).

More specifically, the symbol counter 120 waits for the input of the symbol timing 402 from the evaluating unit 40 (step S34). When the symbol timing 402 is input, the symbol counter 120 increments the symbol count value 423 by one (step S35).

Then, the symbol count value 423 synchronizes with the symbol timing 402 and counted up as shown in FIG. 4.

Figure 8:
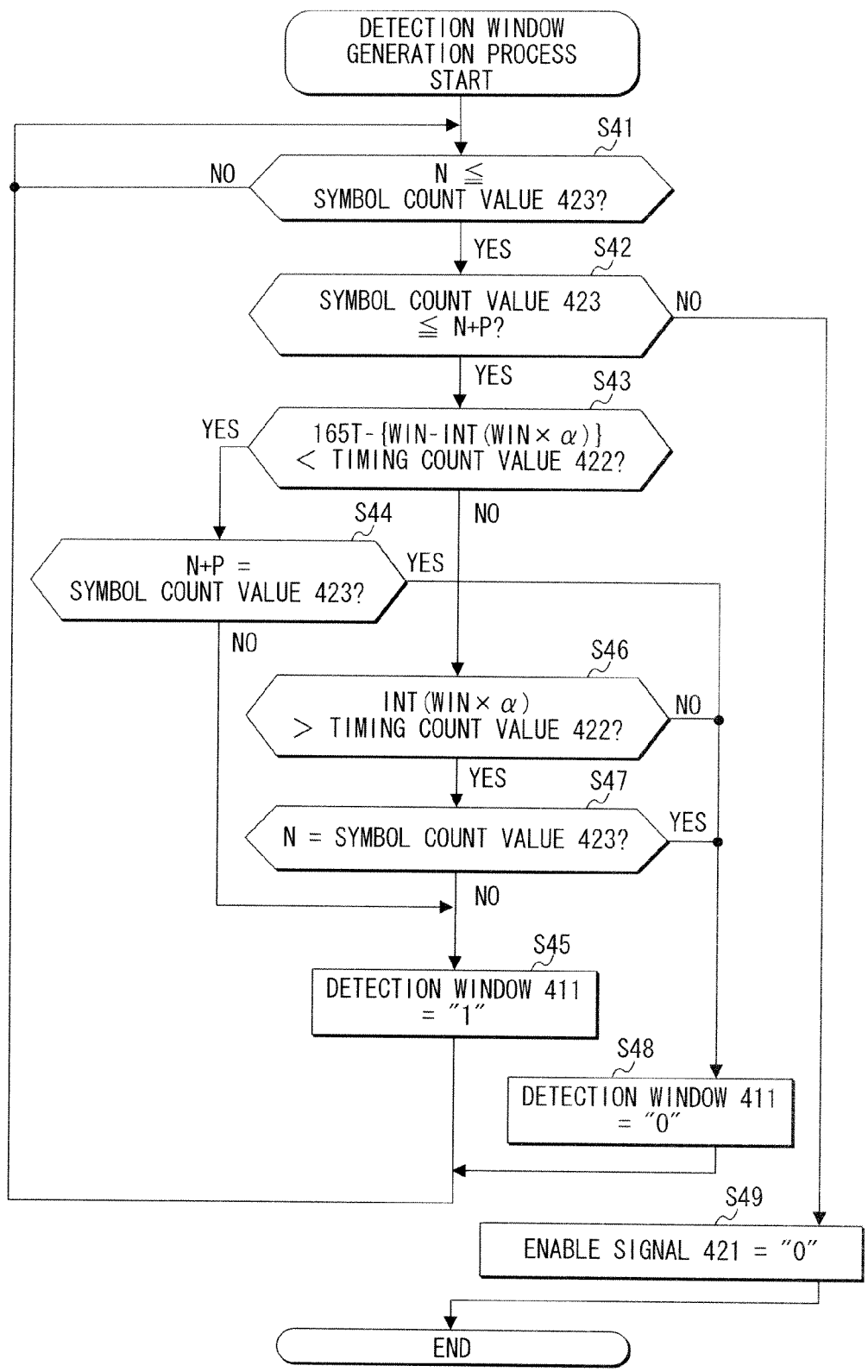
FIG. 8 is a flowchart showing a generation process example of a detection window in the controlling unit used in the frequency correction circuit according to the embodiment of the present invention.

Hereinafter, an example of the generation process of the detection window 411 in the controlling unit 130 is explained in detail with reference to FIG. 8. In FIG. 8, a parameter WIN indicates the time width of the detection window 411 and previously set according to a period length d in which the delayed wave could exist in the radio transmission line. For example, when the period length d is "5T", WIN is set to "11T" 2d+1), which is twice the period length d. A coefficient α(0<α<1) is used to determine a center phase of the detection window 411 (in other words, a timing to open the detection window 411). INT is a function to integerize an argument value.

As shown in FIG. 8, the controlling unit 130 waits for the symbol count value 423 to reach N ("17" in the example of FIG. 4) (step S41).

When the symbol count value 423 reaches N, the controlling unit 130 repeatedly executes the process shown in the steps S43 to S48 while the symbol count value 423 is N+P ("23" (17+6) in the example of FIG. 4) (step S42).

More specifically, firstly the controlling unit 130 evaluates whether or not the timing count value 422 is greater than "165T−{WIN−INT(WIN×α)}" (in other words, whether or not the timing to open the detection window 411 has come) (step S43). When "165T−{WIN−INT(WIN×α)}"<the timing count value 422 is satisfied, the controlling unit 130 evaluates that the timing to open the detection window 411 has come. However, when the symbol count value 423="N+P" (in other words, the current symbol timing is the last symbol timing to be detected by the frequency offset Δf) (step S44), the controlling unit 130 evaluates that it is not the timing to exceptionally open the detection window 411.

When it is evaluated that the timing to open the detection window 41 has come in the above steps S43 and S44, the controlling unit 130 sets the detection window 411 to "1" (high) to open the detection window 411 (step S45).

Then, the controlling unit 130 continues to monitor the timing count value 422 and maintains the detection window 411 to "1" (opened state) while "15T−{WIN−INT(WIN×α)}"<the timing count value 422 is satisfied. After that, the controlling unit 130 evaluates whether or not the timing count value 422 is smaller than "INT(WIN×α)" (in other words, whether or not to maintain the detection window 411 in the opened state when the timing count value 422 is once reset and counting up is resumed) (step S46). When "INT(WIN×α)">the timing count value 422 is satisfied, the controlling unit 130 evaluates that the detection window 411 should be maintained in the opened state. However, when the symbol count value 423="N" (in other words, when the current symbol timing is the first symbol timing to be detected by the frequency offset Δf and the detection window 411 is not opened yet) (step S47), the controlling unit 130 evaluates that the detection window 411 should not be exceptionally maintained in the opened state.

When it is evaluated that the detection window 411 should be maintained in the opened state in the abovementioned steps S46 and S47, the controlling unit 130 proceeds to the above step S45 and maintains the detection window 411 to "1".

On the other hand, when it is evaluated that the detection window 411 should not be maintained in the opened state in the above step S46 or S47 or it is not the timing to open the detection window 411 in the above step S44, the controlling unit 130 sets the detection window 411 to "0" (low) to close the detection window 411 (step S48).

Note that when the symbol count value 423>"N+P" is satisfied in the above step S42, the controlling unit 130 outputs the enable signal 421"0" to stop the operations of the timing counter 110 and the symbol counter 120 (step S49).

Then, as shown in FIG. 4, the detection window 411 is opened for the time equivalent to INT(WIN×α) from the symbol timing corresponding to each of the receiving symbols S18 to S23 and closed after the time equivalent to WIN elapses.

The maximum value detecting unit 200 detects a correlation peak from the correlation values input during the period when the detection window 411 is opened and outputs the correlation peak to the frequency correction unit 300 as the maximum correlation value 412.

FIG. 4 shows the case in which as a result of AGC and the like, in the receiving band f1, the symbol timing 402 and the positions of the correlation peaks P18 and P19 corresponding to the receiving symbols S18 and S19 match. As shown in FIG. 4, the correlation peaks P18 and P19 appear within the period when the detection window 411 is opened. Therefore, the maximum value detecting unit 200 can detect the correlation peaks P and P19 as h maximum correlation value 412 corresponding to the receiving band f1.

On the other hand, in the receiving band f2, the case is shown in which the correlation peaks P20 and P21 corresponding to the receiving symbols S20 and S21 appear after the symbol timing 402. However, as shown in FIG. 4, the correlation peaks 20 and P21 appear within the period when the detection window 411 is opened. Therefore, the maximum value detecting unit 200 does not miss but can detect the correlation peaks P20 and P21 as the maximum correlation value 412 corresponding to the receiving band f2.

Further, in the receiving band f3, the case is shown in which the correlation peaks P22 and P23 corresponding to the receiving symbols S22 and S23 appear before the symbol timing 402. However, as shown in FIG. 4, the correlation peaks P22 and P23 appear within the period when the detection window 411 is opened. Therefore, the maximum value detecting unit 200 does not miss but can detect the correlation peaks P22 and P23 as the maximum correlation value 412 corresponding to the reception band f3.

The frequency correction unit 300 detects and holds the frequency offsets Δf1 to Δf3 for the receiving bands f1 to f3 by the above formula (1). Then, the frequency correction unit 300 generates the frequency correction signal 403 according to the switched receiving band using one of the frequency offsets Δf1 to Δf3 according to the receiving band indication signal 404.

As explained above, in this embodiment, it is possible to surely detect the correlation peak that could appear within the certain period before and after the symbol timing and to contribute to the frequency offset correction. Therefore, the frequency offset can be corrected even when the symbol timing and the peak position of the correlation value differ. Further, as shown in FIG. 3, only one frequency offset detection circuit should be mounted while Japanese Unexamined Patent Application Publication No. 2009-141634 (Yasukawa) requires the frequency offset detection circuits for the number corresponding to the period in which the delayed wave could exist. Accordingly, the size of the frequency correction circuit can be largely reduced as compared to the technique disclosed by Yasukawa. Thus, this embodiment can achieve both the advantages to suppress the increase in the circuit size and improve the correction accuracy of the frequency offset. In addition, as only one frequency offset detection circuit should be mounted, the advantage is achieved that the power consumption for the detection of the frequency offset can be reduced.

Moreover, this embodiment uses the symbol timing that comes after a predetermined period has elapsed since when the symbol timing 402 is detected (specifically, after performing AGC as the symbol timing to be detected by the frequency offset Δf. Therefore, optimal frequency correction can be performed to the received signal.

Additionally, in this embodiment, the time width WIN of the detection window 411 is set according to the period length d in which the delayed wave could exist, and the center phase of the detection window 411 is determined using the coefficient α. Therefore, the correction accuracy of the frequency offset can be dynamically changed conforming to the delay characteristics in the operational environment of the radio receiving apparatus.

In this embodiment, the adjacent symbol timing on the time axis in the same receiving band is used as the symbol timing to be detected by the frequency offset Δf. In this case, it is not necessary to provide excessive amount of delay to the above n-symbol delay circuit 311 and the increase in the size of the frequency correction circuit can further be suppressed.

Note that it is clear that the present invention is not limited by the abovementioned embodiment and various modifications can be made by those skilled in the art based on the description of the claims.

For example, the above maximum correlation value 412 can contribute to the correction of a phase deviation in each frequency band (a phase difference between the symbol timing and the correlation peak). In the example of FIG. 4, in the receiving band f2, the phase of the symbol timing 402 is proceeded to match the phase of the correlation peak P20 or P21 detected in the detection window 411. On the other hand, in the receiving band f3, the phase of the symbol timing 402 is delayed to match the phase of the correlation peak P22 or P23 detected in the detection window 411. As described so far, the present invention can correct the phase deviation by a simple configuration using the detection window.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A communication apparatus comprising:
  a matched filter unit that generates a correlation value between a received signal and a predetermined reference signal;

an evaluating unit that generates a timing signal based on a correlation value of a first received signal transmitted in a first frequency band, the timing signal indicating a symbol timing of the first received signal;

a detection window generating unit that generates a maximum value detection window based on the timing signal, the maximum value detection window, opened for a predetermined time period, for, detecting a peak of the correlation value of a second received signal transmitted in a second frequency band;

a maximum value detecting unit that detects the peak of the correlation value of the second received signal in the maximum value detection window; and a correction unit that corrects a deviation in a frequency or a phase in the second frequency band based on the peak of the correlation value detected by the maximum value detecting unit.

2. The communication apparatus according to claim 1, wherein the evaluating unit starts generating the timing signal in a preamble period of the first received signal, and the detection window generating unit generates the maximum value detection window according to a count number of a pulse of the timing signal.

3. The communication apparatus according to claim 1, wherein:

a width of the maximum value detection window is previously set depending on a period in which a delayed wave could exist in a transmission line for transmitting the received signal, and the width of the maximum value detection window is substantially twice the period in which the delayed wave could exist.

4. The communication apparatus according to claim 1, wherein said detection window generating unit comprises:

a timing counter;

a symbol counter; and a controlling unit.

5. The communication apparatus according to claim 4, wherein said symbol timing is input in common to said timing counter, said symbol counter and said controlling unit.

6. The communication apparatus according to claim 1, wherein said correction unit generates a frequency correction signal according to said peak correlation value.

7. The communication apparatus according to claim 1, wherein said correction unit comprises only one frequency offset detection circuit.

8. The communication apparatus according to claim 1, further comprising a Radio Frequency (RF) unit connected to said correction unit, wherein said correction unit recognizes a receiving band in said RF unit according to a receiving band indication signal output from said RF unit.

* * * * *